United States Patent
Qin

(10) Patent No.: US 12,535,169 B2
(45) Date of Patent: Jan. 27, 2026

(54) PIPELINE MOUNTING HEAD FOR VEHICLE, PIPELINE STRUCTURE AND VEHICLE

(71) Applicants: ZHEJIANG GEELY HOLDING GROUP CO., LTD., Hangzhou (CN); ZHEJIANG LIANKONG TECHNOLOGIES CO., LTD., Zhejiang (CN)

(72) Inventor: Chao Qin, Ningbo (CN)

(73) Assignees: ZHEJIANG GEELY HOLDING GROUP CO., LTD., Hangzhou (CN); ZHEJIANG LIANKONG TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/873,904

(22) PCT Filed: Jul. 13, 2023

(86) PCT No.: PCT/CN2023/107300
§ 371 (c)(1),
(2) Date: Dec. 11, 2024

(87) PCT Pub. No.: WO2024/066670
PCT Pub. Date: Apr. 4, 2024

(65) Prior Publication Data
US 2025/0376018 A1    Dec. 11, 2025

(30) Foreign Application Priority Data
Sep. 29, 2022   (CN) .......................... 202211204149.2

(51) Int. Cl.
*F16L 41/02* (2006.01)
*B60K 11/02* (2006.01)
(Continued)

(52) U.S. Cl.
CPC ............. *F16L 41/021* (2013.01); *B60K 11/02* (2013.01); *F16L 37/04* (2013.01); *F16L 41/03* (2013.01)

(58) Field of Classification Search
CPC ....... F16L 41/03; F16L 41/021; F16L 41/001; F16L 41/02; B60K 11/02
(Continued)

(56) References Cited

U.S. PATENT DOCUMENTS 3,469,863 A * 9/1969 Riester .................... F16L 37/56
285/379
4,893,845 A * 1/1990 Bartholomew ..... F16L 37/0987
285/272
(Continued)

FOREIGN PATENT DOCUMENTS

| CN | 101617132 A | 12/2009 |
| CN | 201651564 U | 11/2010 |

(Continued)

OTHER PUBLICATIONS

PCT/CN2023/107300 International Search Report dated Oct. 23, 2023.
(Continued)

*Primary Examiner* — David Bochna
(74) *Attorney, Agent, or Firm* — IPro, PLLC

(57) ABSTRACT

A pipeline mounting head for a vehicle, comprising a mounting plate, two branch pipelines located on one side of the mounting plate, and a main pipeline located on the other side of the mounting plate and communicating with the branch pipelines, where a snap-fit member is provided on the mounting plate, and is located on the same side of the mounting plate as the branch pipelines. The snap-fit member is arranged on the mounting plate, so that the vehicle pipeline mounting head can be easily fixed to a vehicle, has (Continued)

a simple mounting structure, and is easy to operate. Further disclosed are a pipeline structure and a vehicle having the pipeline structure.

12 Claims, 3 Drawing Sheets

(51) Int. Cl.
    *F16L 37/04*         (2006.01)
    *F16L 41/03*         (2006.01)

(58) Field of Classification Search
    USPC ......... 285/124.1, 124.2, 124.3, 124.4, 130.1, 285/129.1, 124.5, 141.1, 140.1, 903
    See application file for complete search history.

(56) References Cited

U.S. PATENT DOCUMENTS

| | | | | |
|---|---|---|---|---|
| 5,295,719 | A * | 3/1994 | Dal Palu' | F16L 41/03 285/294.1 |
| 5,692,783 | A * | 12/1997 | Watanabe | F16L 37/098 285/61 |
| 5,865,474 | A * | 2/1999 | Takahashi | F16L 37/56 285/124.1 |
| 6,447,023 | B1 * | 9/2002 | Grimm | F16L 5/14 285/921 |
| 6,991,270 | B2 * | 1/2006 | Ito | F16L 37/0885 285/903 |
| 7,717,476 | B2 * | 5/2010 | Shida | F16L 37/008 285/204 |
| 10,351,179 | B2 * | 7/2019 | Schulte | B60K 11/02 |
| 11,274,781 | B1 * | 3/2022 | Kamerath | F16L 41/03 |
| 12,228,232 | B2 * | 2/2025 | Guo | F16L 41/03 |
| 2012/0286506 | A1 * | 11/2012 | Mckenzie | F16L 41/03 285/125.1 |
| 2015/0276122 | A1 | 10/2015 | Hirano et al. | |
| 2017/0051853 | A1 * | 2/2017 | Wu | F16L 41/021 |
| 2019/0061831 | A1 | 2/2019 | Schulte | |
| 2020/0041059 | A1 * | 2/2020 | Genoni | F16L 41/03 |
| 2023/0420787 | A1 * | 12/2023 | Baseri | B60L 58/26 |
| 2024/0001806 | A1 * | 1/2024 | Agnihotri | B60L 58/26 |

FOREIGN PATENT DOCUMENTS

| | | |
|---|---|---|
| CN | 203907017 U | 10/2014 |
| CN | 105390773 A | 3/2016 |
| CN | 210687409 U | 6/2020 |
| CN | 210707249 U | 6/2020 |
| CN | 214789689 U | 11/2021 |
| CN | 215111208 U | 12/2021 |
| CN | 215522378 U | 1/2022 |
| CN | 115493012 A | 12/2022 |
| EP | 2985560 A1 | 2/2016 |
| FR | 2781311 A1 | 1/2000 |
| GB | 2285302 A | 7/1995 |
| JP | 2004291539 A | 10/2004 |
| JP | 2011133003 A | 7/2011 |

OTHER PUBLICATIONS

CN2022112041492 first office action dated Mar. 28, 2025.
PCT/CN2023/107300 Written Opinion of the international searching authority dated Oct. 23, 2023.
CN2022112041492 second office action dated Sep. 5, 2025.
EP23869917.7 extended European search report dated Jul. 18, 2025.

* cited by examiner

PIPELINE MOUNTING HEAD FOR VEHICLE, PIPELINE STRUCTURE AND VEHICLE

CROSS REFERENCE TO RELATED APPLICATIONS

The present application is a U.S. National Stage of International Application No. PCT/CN2023/107300 filed on Jul. 13, 2023 which claims priority to Chinese Patent Application No. 202211204149.2 field on Sep. 29, 2022, the content of which is incorporated herein by reference in its entirety.

TECHNICAL FIELD

The present disclosure relates to the field of vehicles, in particular to a pipeline mounting head for a vehicle, a pipeline structure and a vehicle.

BACKGROUND

With the development of new energy vehicles and hybrid vehicles, users have higher and higher requirements for battery life. During the driving of a vehicle, the battery usually generates heat to increase the temperature of a battery pack, which affects the use effect and the service life of the battery pack, so it is necessary to install a cooling system to cool the battery. When the cooling system is installed, a four-way pipeline is generally installed on a vehicle body at first, then a cooling water pipe is assembled, and finally a subframe is installed and locked by screws/nuts. The whole installation process is complicated, and it is difficult to ensure the sealing between the cooling system and the vehicle body after installation.

Therefore, a novel pipeline mounting head for a vehicle is needed to solve the above problems.

SUMMARY

The present disclosure provides a pipeline mounting head for a vehicle, which comprises a mounting plate, two branch pipelines located on one side of the mounting plate, and a main pipeline located on the other side of the mounting plate and communicated with the branch pipelines; the mounting plate is provided with a snap-fit member; and the snap-fit member and the branch pipelines are located on the same side of the mounting plate.

Further, the snap-fit member is provided with an elastically deformable snap-fit member, and a gap is provided between the snap-fit member and the mounting plate.

Further, the mounting plate is provided with a sealing gasket, the sealing gasket is in the shape of a square, and the middle of the sealing gasket is provided with an opening through which the branch pipelines and the snap-fit member penetrate.

Further, the lower part of the main pipeline is provided with a positioning pin which is perpendicular to the mounting plate, and the positioning pin is disconnected from the main pipeline when stressed.

The present disclosure provides a pipeline structure, which comprises any of the above pipeline mounting heads for the vehicle, and further comprises a cooling water pipe connected with the main pipeline.

Further, the cooling water pipe comprises a corrugated pipe and a nylon pipe connected with the corrugated pipe, and the corrugated pipe is connected with both ends of the main pipeline.

The present disclosure provides a vehicle, comprising the above pipeline structure, and further comprising a vehicle body and a subframe assembled on the vehicle body, and after the pipeline structure is assembled on the subframe, the subframe is assembled with the vehicle body.

Further, a sheet metal member of the vehicle body is provided with a fixing hole, the snap-fit member penetrates through the fixing hole and then is snapped on the sheet metal member, the sealing gasket is located between the mounting plate and the sheet metal member, and the sheet metal member is snapped in the gap.

Further, the cooling water pipe is provided with a fixing bracket, the cooling water pipe is fixed with the subframe through the fixing bracket, the cooling water pipe comprises a corrugated pipe connected with both ends of the main pipeline, and a buffer space exists between the cooling water pipe and the subframe.

Further, the subframe is provided with a positioning hole matched with the positioning pin, the positioning pin is fixed in the positioning pin before disconnected, and a gap exists between a pipeline joint and the subframe, where the pipeline joint is the pipeline mounting head for the vehicle.

REFERENCE SIGNS

Figure 1:
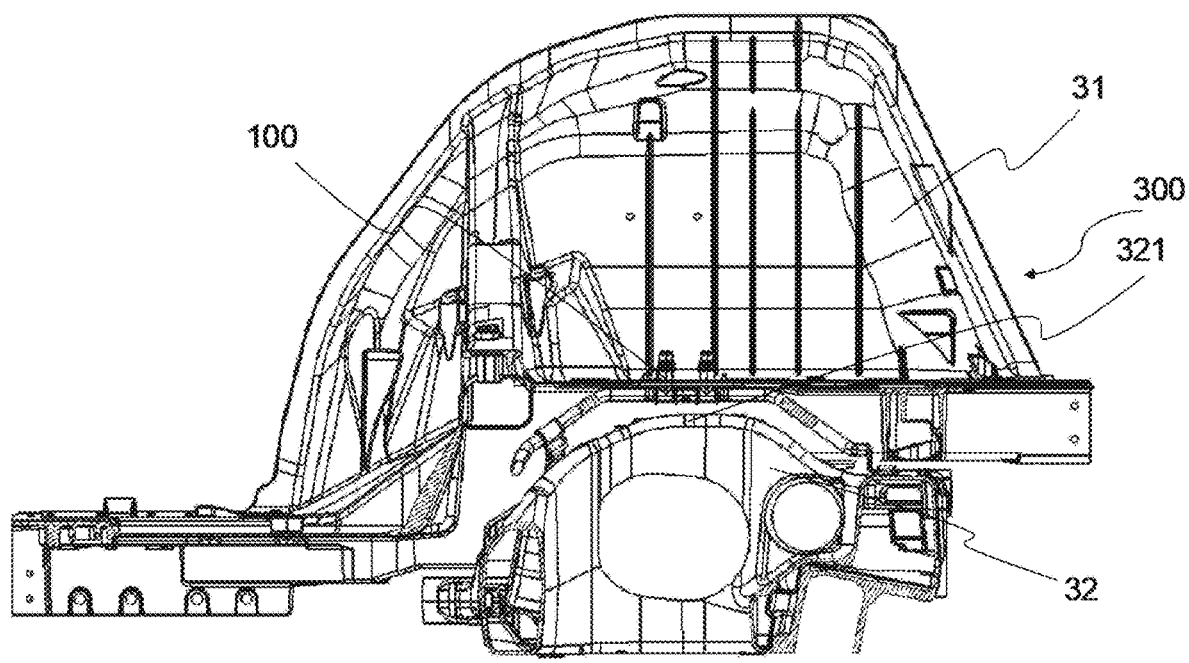
FIG. 1 is a sectional view of a vehicle assembled with a pipeline mounting head and a pipeline structure in the present disclosure.

100—pipeline mounting head; 11—mounting plate; 111—sealing gasket; 112—opening; 12—branch pipeline; 121—bevel bulge; 122—groove; 13—main pipeline; 131—left main pipeline; 132—right main pipeline; 133—connecting part; 134—mounting part; 135—sealing structure; 14—snap-fit member; 141—snap-fit part; 142—gap; 15—positioning pin; 200—pipeline structure; 21—cooling water pipe; 211—corrugated pipe; 212—nylon pipe; 213—fixing bracket; 300—vehicle; 31—vehicle body; 311—sheet metal member; 32—subframe; 321—positioning hole.

DETAILED DESCRIPTION

Examples will be explained in detail here, as exemplified in the drawings. When the description below involves the drawings, the same numbers in different drawings represent the same or similar elements unless otherwise indicated. The embodiments described in the following examples do not represent all embodiments consistent with the present disclosure. On the contrary, they are only examples of devices that are consistent with some aspects of the present disclosure as detailed in the attached claims.

The terms used in the present disclosure are solely for the purpose of describing specific embodiments and are not intended to limit the present disclosure. Unless otherwise defined, the technical terms or scientific terms used in the present disclosure shall have the usual meanings understood by those ordinary skilled in the art in the present disclosure.

The words "first", "second" and similar words used in the description and claims of the present disclosure do not indicate any order, quantity or importance, but are used only to distinguish different components. Similarly, such words as "one" or "a" are merely used to represent the existence of at least one member, rather than to limit the number thereof. "Multiple" or "a plurality of" indicates two or more members. Similar words such as "comprise" or "include" indicate that the element or object that appears before "comprise" or "include" covers the element or object listed after "comprise" or "include" and the equivalent thereof, and does not exclude other elements or objects. Similar words such as "connect" or "connected" are not limited to physical or mechanical connections, but can include electrical connection, whether direct or indirect. The singular "a", "said" and "the" used in the description and the attached claims of the present disclosure are also intended to include multiple forms, unless the context clearly indicates other meanings. It should also be understood that the term "and/or" used herein refers to and includes any or all possible combinations of one or more associated listed items.

The present disclosure aims to provide a pipeline mounting head for a vehicle, a pipeline structure and a vehicle, which has a simple structure and convenient installation and can ensure the sealing between the pipeline structure and the vehicle.

As shown in FIG. 1, the present disclosure provides a pipeline mounting head 100 for a vehicle, and the pipeline mounting head 100 for the vehicle is assembled on a vehicle 300 together with a pipeline structure 200. The pipeline mounting head 100 for the vehicle includes a mounting plate 11, two branch pipelines 12 located on one side of the mounting plate 11, and a main pipeline 13 located on the other side of the mounting plate 11 and communicated with the branch pipelines 12. When the pipeline mounting head 100 for the vehicle is mounted to a vehicle body 31, the two branch pipelines 12 are located in the vehicle body 31, and the main pipeline 13 is located outside the vehicle body 31.

Figure 2:
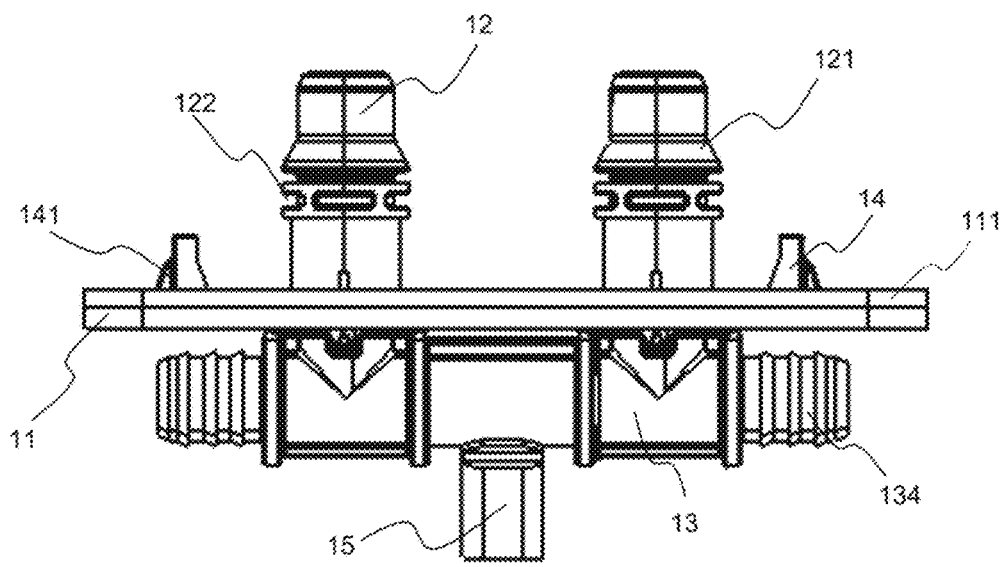
FIG. 2 is a side view of the pipeline mounting head in FIG. 1.
Figure 3:
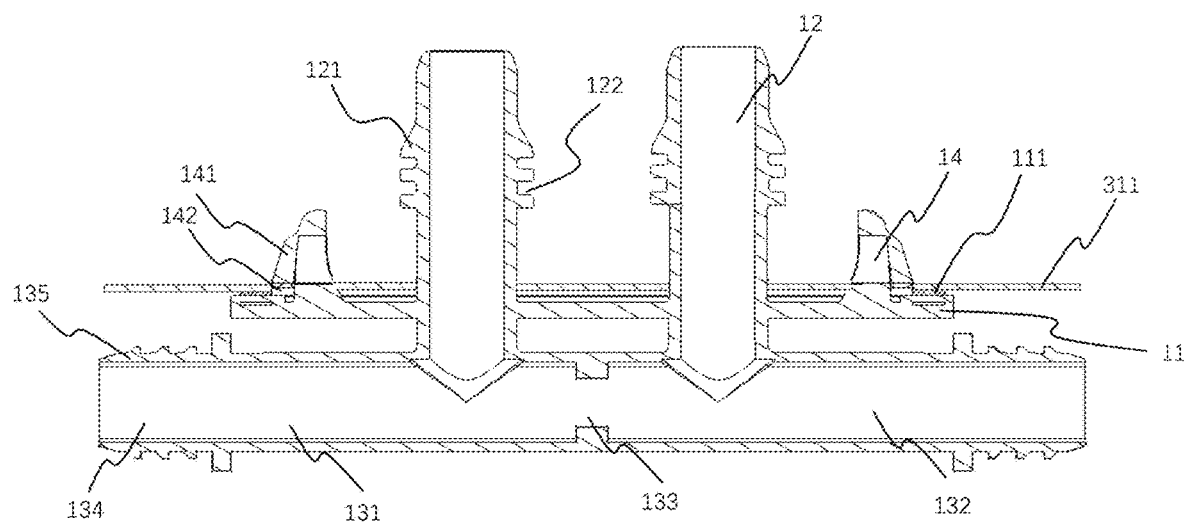
FIG. 3 is a local sectional view of the assembled pipeline mounting head and vehicle body in FIG. 1.

As shown in FIG. 2 and FIG. 3, the branch pipelines 12 are cylindrical. In order to facilitate the installation of the branch pipelines 12 into the vehicle body 31, each branch pipeline 12 is provided with a quick-insert structure or a snap-fit structure. In some embodiments, the branch pipeline 12 is provided with the quick-insert structure. Specifically, a middle part of the branch pipeline 12 is provided with at least two bulges. An outer diameter of each of the bulges is greater than a whole outer diameter of the branch pipeline 12, and a groove 122 is arranged between the bulges.

A bulge at the top of the branch pipeline 12 is arranged as a bevel bulge 121. The bevel of the bevel bulge 121 is formed by extending a surface of the branch pipeline 12 to the bulge, and the bevel is set to facilitate the quick insertion of the branch pipeline 12 into the vehicle body 31. In the present embodiment, in order to ensure the insertion effect and the fixing effect after insertion, two grooves 122 are formed between the bulges on the branch pipeline 12. In other words, the branch pipeline 12 can be quickly inserted into the vehicle body 31 by providing the bevel bulge 121 and a plurality of grooves 122 on the branch pipeline 12. In other embodiments, the branch pipeline 12 is provided with the snap-fit structure to facilitate the coordination between the branch pipeline 12 and the vehicle body 31.

The main pipeline 13 is communicated with the two branch pipelines 12 in a vertical direction. Specifically, the main pipeline 13 includes a left main pipeline 131 and a right main pipeline 132, and the left main pipeline 131 and the right main pipeline 132 have a same inner diameter. A connecting part 133 is arranged between the left main pipeline 131 and the right main pipeline 132. An inner diameter of the connecting part 133 is less than the inner diameter of the left main pipeline 131 and right main pipeline 132. This structure can ensure the liquidity of the coolant inside the entire pipeline mounting head 100 and improve the cooling effect. A mounting part 134 is arranged at an outlet of the left main pipeline 131 and the right main pipeline 132 respectively, and a sealing structure 135 is arranged on the mounting part 134, which can improve the sealing effect between the mounting part 134 and a cooling water pipe 21.

The mounting plate 11 is provided with an elastically deformable snap-fit member 14, and the snap-fit member 14 and the branch pipelines 12 are located on a same side of the mounting plate 11. When the pipeline mounting head 100 is mounted on the vehicle body 31, the snap-fit member 14 is used to snap-fit with the vehicle body 31. In the present embodiment, the snap-fit member 14 is provided with a snap-fit part 141, the snap-fit part 141 can generate elastic deformation under stress, and a gap 142 is arranged between the snap-fit part 141 and the mounting plate 11.

In another embodiment, the snap-fit member 14 includes an elastically deformable snap-fit part and a fixed part which is fixed to the mounting plate. The snap-fit part is arranged on the fixed part, and a gap is arranged between a bottom of the snap-fit part and the mounting plate 11.

To ensure the sealing effect, the mounting plate 11 is provided with a sealing gasket 111, and the sealing gasket 111 is a square frame structure. The sealing gasket 111 is provided with an opening 112 through which the two branch pipelines 12 and two snap-fit members 14 penetrate.

A lower part of the main pipeline 13 is provided with a positioning pin 15 which is arranged perpendicular to the mounting plate 11. In the present embodiment, the positioning pin 15 is fixed on the main pipeline 13 by hot melting. When the positioning pin 15 is subjected to a force of which a direction is different from directions of forces acting on the mounting plate 11 and the main pipeline 13, the positioning pin 15 is disconnected from the main pipeline 13.

Figure 5:
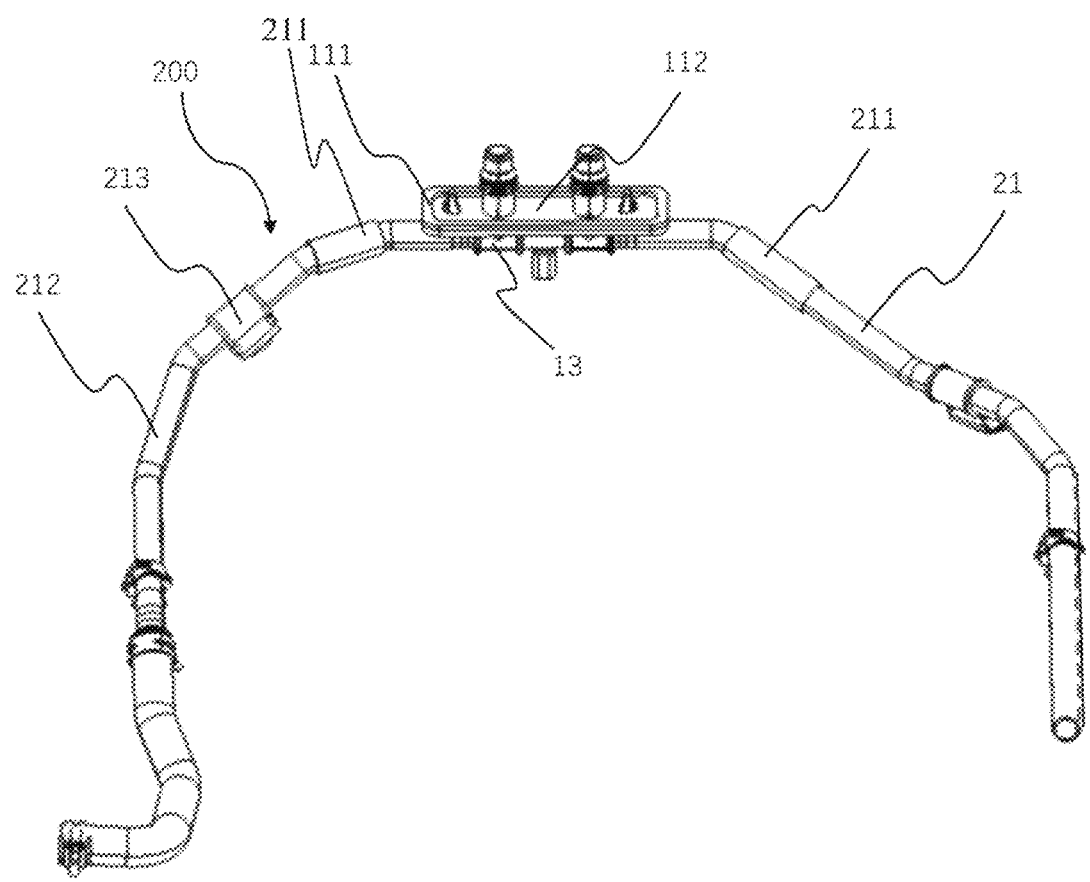
FIG. 5 is a stereogram of the pipeline structure in FIG. 1.

As shown in FIG. 5, the present disclosure provides a pipeline structure 200. The pipeline structure 200 includes the pipeline mounting head 100 for the vehicle and the cooling water pipe 21 mounted on the pipeline mounting head 100 for the vehicle. Specifically, the cooling water pipe 21 is mounted on the mounting parts 134 on the left and right ends of the main pipeline 13 by cooperating with the sealing structure 135.

The cooling water pipe 21 includes a corrugated pipe 211 and a nylon pipe 212 connected with the corrugated pipe 211, where the corrugated pipe 211 is connected with the mounting part 134. The nylon pipe 212 of the cooling water pipe 21 is also provided with a fixing bracket 213, and the cooling water pipe 21 is fixed with a subframe 32 through the fixing bracket 213.

Figure 4:
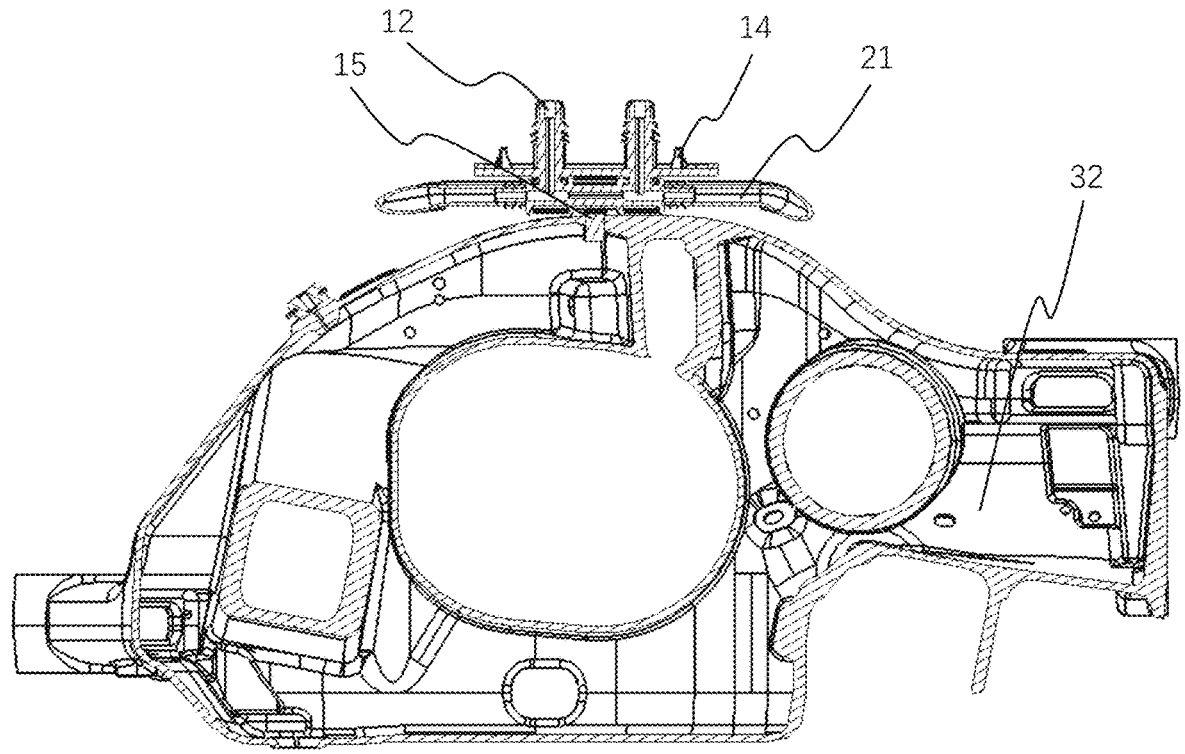
FIG. 4 is a sectional view of the assembled pipeline structure and subframe.

The pipeline structure 200 is applied to the vehicle 300, and the vehicle 300 is provided with the vehicle body 31 and the subframe 32 assembled on the vehicle body 31. As shown in FIG. 4, when the pipeline structure 200 is assembled, firstly, the positioning pin 15 is snapped into a positioning hole 321 on the subframe 32, and the pipeline mounting head 100 for the vehicle and the subframe 32 are preliminarily positioned; and then the cooling water pipe 21 is also fixed to the subframe 32 through the fixing bracket 213, so that the pipeline mounting head 100 is close to the subframe 32. A gap exists between the cooling water pipe 21 and the vehicle body 31. When the subframe 32 moves relative to the vehicle body 31 in a driving process of the vehicle, the corrugated pipe part of the cooling water pipe 21 can absorb the movement and play a buffering role.

Subsequently, the pipeline structure 200 and the subframe 32 are lifted upward jointly to cooperate with a sheet metal member 311 on the vehicle body 31. The sheet metal member 311 is provided with a fixing hole (not shown) through which the snap-fit member 14 penetrates. An upward pull force is applied to the pipeline structure 200; the snap-fit part 141 of the snap-fit member 14 deforms and penetrates through the fixing hole on the sheet metal member 311; then, the snap-fit member 14 recovers from deformation; and the snap-fit part 141 is snapped with the sheet metal member 311. Thus, the mounting plate 11 is close to the sheet metal member 311. The sheet metal member 311 compacts the sealing gasket 111 and is snapped into the gap 142 between the snap-fit part 141 and the mounting plate 11. At this moment, the sealing gasket 111 is located between the mounting plate 11 and the sheet metal member 311.

After the pipeline structure 200 and the subframe 32 are mounted on the vehicle body 31, a small force is applied to the positioning pin 15 to disconnect the positioning pin from the main pipeline 13 and fall off. At this moment, a space exists between the pipeline mounting head 100 and the subframe 32. Provision of the positioning pin 15 ensures that the pipeline structure 200 and the subframe 32 can be accurately mounted on the vehicle body 31 and a gap is allowed between the pipeline structure 200 and surrounding components after installation.

The pipeline mounting head 100, the pipeline structure 200 and the vehicle 300 are provided by the present disclosure. The mounting plate 11 is provided with the snap-fit member 14 and the sealing gasket 111, and the snap-fit member 14 is snapped with the sheet metal member 311 so that the pipeline mounting head 100 can be conveniently mounted on the vehicle body 31 and the fixing effect and the sealing effect can be guaranteed. By mounting the disconnectable positioning pin 15 on the main pipeline 13, during installation, the pipeline structure 200 can be preliminarily positioned on the subframe 32 through the positioning pin 15; then the subframe 32 and the pipeline structure 200 are mounted on the vehicle body 31 as a whole; and subsequently, a force is applied to the positioning pin 15 to disconnect the positioning pin 15 from the main pipeline 13. The positioning pin 15 can ensure that the subframe 32 and the pipeline structure 200 are accurately positioned with the fixing hole of the sheet metal member 311 is to reduce mounting difficulty.

In the pipeline joint, i.e., the pipeline mounting head, for the vehicle provided by the present disclosure, the mounting plate is provided with the snap-fit member which is deformable, and the pipeline structure is formed after the cooling water pipe is mounted on the pipeline mounting head for the vehicle. When the whole pipeline structure is assembled to the vehicle body, the snap-fit member and the vehicle body are snapped for fixation. At the same time, the sheet metal member of the vehicle body compacts a sealing element and then is snapped in the gap between the snap-fit member and the mounting plate to ensure a sealing effect. The disconnectable positioning pin is arranged on the main pipeline, which can ensure that the pipeline structure is accurately mounted on the vehicle body and the subframe to reduce the mounting difficulty.

The description only describes preferred embodiments of the present disclosure and is not intended to limit the present disclosure in any form. Any modification, equivalent replacement, improvement, etc. made within the content of the present disclosure shall be included in the protection scope of the present disclosure.

The invention claimed is:

1. A pipeline mounting head for a vehicle, comprising:
   a mounting plate,
   two branch pipelines located on one side of the mounting plate, and
   a main pipeline located on the other side of the mounting plate and communicated with the branch pipelines,
   wherein the mounting plate is provided with a snap-fit member, and the snap-fit member and the branch pipelines are located on the same side of the mounting plate, and
   a lower part of the main pipeline is provided with a positioning pin which is perpendicular to the mounting plate, and the positioning pin is disconnected from the main pipeline when stressed.

2. The pipeline mounting head for the vehicle according to claim 1, wherein the snap-fit member is provided with an elastically deformable snap-fit part, and a gap is provided between the snap-fit part and the mounting plate.

3. The pipeline mounting head for the vehicle according to claim 1, wherein the mounting plate is provided with a sealing gasket, and a middle of the sealing gasket is provided with an opening through which the branch pipelines and the snap-fit member penetrate.

4. A pipeline structure, comprising:
   a pipeline mounting head for a vehicle, the pipeline mounting head for the vehicle comprising a mounting plate, two branch pipelines located on one side of the mounting plate, and a main pipeline located on the other side of the mounting plate and communicated with the branch pipelines, wherein the mounting plate is provided with a snap-fit member, and the snap-fit member and the branch pipelines are located on the same side of the mounting plate, a lower part of the main pipeline is provided with a positioning pin which is perpendicular to the mounting plate, and the positioning pin is disconnected from the main pipeline when stressed, and
   the pipeline structure further comprising a cooling water pipe connected with the main pipeline.

5. The pipeline structure according to claim 4, wherein the cooling water pipe comprises a corrugated pipe and a nylon pipe connected with the corrugated pipe, and the corrugated pipe is connected with both ends of the main pipeline.

6. The pipeline structure according to claim 4, wherein the snap-fit member is provided with an elastically deformable snap-fit part, and a gap is provided between the snap-fit part and the mounting plate.

7. The pipeline structure according to claim 4, wherein the mounting plate is provided with a sealing gasket, and a middle of the sealing gasket is provided with an opening through which the branch pipelines and the snap-fit member penetrate.

8. A vehicle, comprising:
   a pipeline structure, the pipeline structure comprising a pipeline mounting head for a vehicle and a cooling water pipe, the pipeline mounting head for the vehicle comprising a mounting plate, two branch pipelines located on one side of the mounting plate, and a main pipeline located on the other side of the mounting plate and communicated with the branch pipelines, wherein the mounting plate is provided with a snap-fit member, and the snap-fit member and the branch pipelines are located on the same side of the mounting plate, a lower part of the main pipeline is provided with a positioning pin which is perpendicular to the mounting plate, and the positioning pin is disconnected from the main pipeline when stressed, and the cooling water pipe is connected with the main pipeline, and the vehicle further comprising a vehicle body and a subframe assembled on the vehicle body, wherein after the pipeline structure is assembled on the subframe, the subframe and the pipeline structure are assembled with the vehicle body.

9. The vehicle according to claim 8, wherein the mounting plate is provided with a sealing gasket, and a middle of the sealing gasket is provided with an opening through which the branch pipelines and the snap-fit member penetrate, the snap-fit member is provided with an elastically deformable snap-fit part, and a gap is provided between the snap-fit part and the mounting plate, and a sheet metal member of the vehicle body is provided with a fixing hole, the snap-fit member penetrates through the fixing hole and then is snapped on the sheet metal member, the sealing gasket is located between the mounting plate and the sheet metal member, and the sheet metal member is snapped in the gap.

10. The vehicle according to claim 9, wherein the cooling water pipe is provided with a fixing bracket, the cooling water pipe is fixed with the subframe through the fixing bracket, the cooling water pipe comprises a corrugated pipe connected with both ends of the main pipeline, and a buffer space exists between the cooling water pipe and the subframe.

11. The vehicle according to claim 9, wherein the subframe is provided with a positioning hole matched with the positioning pin, the positioning pin is fixed in the positioning hole before disconnected, and a gap exists between the pipeline mounting head for the vehicle and the subframe.

12. The vehicle according to claim 8, wherein the cooling water pipe comprises a corrugated pipe and a nylon pipe connected with the corrugated pipe, and the corrugated pipe is connected with both ends of the main pipeline.

* * * * *